(12) United States Patent
Kerek

(10) Patent No.: US 9,935,713 B2
(45) Date of Patent: *Apr. 3, 2018

(54) COMMUNICATION SYSTEM FOR ANALOG AND DIGITAL COMMUNICATION SERVICES

(71) Applicant: Deltanode Solutions AB, Stockholm (SE)

(72) Inventor: Daniel Kerek, Danderyd (SE)

(73) Assignee: DELTANODE SOLUTIONS AKTIEBOLAG, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/392,426

(22) Filed: Dec. 28, 2016

(65) Prior Publication Data

US 2017/0111115 A1 Apr. 20, 2017

Related U.S. Application Data

(63) Continuation of application No. 14/431,301, filed as application No. PCT/EP2013/069847 on Sep. 24, 2013, now Pat. No. 9,660,728.

(Continued)

(30) Foreign Application Priority Data

Sep. 26, 2012 (SE) ...................................... 1200578

(51) Int. Cl.
 *H04J 14/00* (2006.01)
 *H04B 10/2575* (2013.01)
 (Continued)

(52) U.S. Cl.
 CPC ... *H04B 10/25753* (2013.01); *H04B 10/2503* (2013.01); *H04J 14/0278* (2013.01);
 (Continued)

(58) Field of Classification Search
 CPC .... H04B 10/2575; H04B 1/0057; H04B 1/69; H04B 10/2504; H04B 10/25753;
 (Continued)

(56) References Cited

U.S. PATENT DOCUMENTS 4,916,460 A 4/1990 Powell
5,202,780 A * 4/1993 Fussanger ........... H04J 14/0226
 348/E7.069

(Continued)

FOREIGN PATENT DOCUMENTS

EP 0756185 4/2002
TW 200703951 1/2007

(Continued)

OTHER PUBLICATIONS

Notice of Allowance dated Aug. 8, 2017 for related U.S. Appl. No. 14/431,290 (pp. 1-8).

(Continued)

*Primary Examiner* — Hibret Woldekidan
(74) *Attorney, Agent, or Firm* — Wegman, Hessler & Vanderburg

(57) ABSTRACT

A first and a second interconnection unit comprising a respective first and a second communication interface, a first and a second electro-optical converter, and a multiplexing unit, is disclosed. The first interconnection unit is adapted to receive electrically transmitted analog and digital information, convert said information into electrically transmitted information, and to multiplex the information so as to enable transmission over a bidirectional link. The second interconnection unit is adapted to receive and de-multiplex the transmitted analog and digital information, to convert it back into electrically transmitted analog and digital information, and to output said information. A system comprising the first and second interconnection units is also disclosed. The (Continued)

system is adapted for supplying both analog services and digital services with communication information over the bidirectional link.

18 Claims, 3 Drawing Sheets

Related U.S. Application Data

(60) Provisional application No. 61/705,913, filed on Sep. 26, 2012.

(51) Int. Cl.
| | | |
|---|---|---|
| *H04B 10/25* | (2013.01) | |
| *H04J 14/02* | (2006.01) | |
| *H04Q 11/00* | (2006.01) | |
| *H04W 84/12* | (2009.01) | |
| *H04W 88/08* | (2009.01) | |

(52) U.S. Cl.
CPC .. *H04Q 11/0071* (2013.01); *H04Q 2011/0052* (2013.01); *H04W 84/12* (2013.01); *H04W 88/085* (2013.01)

(58) Field of Classification Search
CPC  H04B 10/1143; H04B 10/40; H04B 10/2503; H04W 72/0453; H04W 88/085; H04W 88/10; H04W 84/12; H04J 14/0278; H04Q 11/0071; H04Q 2011/0052
USPC ... 398/43, 67, 68, 69, 74, 79, 115, 116, 135, 398/138, 139, 141, 91
See application file for complete search history.

(56) References Cited

U.S. PATENT DOCUMENTS

| | | | | |
|---|---|---|---|---|
| 5,748,348 A * | 5/1998 | Heidemann | ............ | H04H 20/69 348/E7.094 |
| 7,333,726 B2 * | 2/2008 | Kenny | ................ | H04J 14/0282 348/E7.07 |
| 7,362,931 B2 * | 4/2008 | Gall | ..................... | H04B 10/272 385/24 |
| 7,565,170 B2 * | 7/2009 | Buscaglia | .............. | H04B 1/126 375/346 |
| 7,599,386 B2 * | 10/2009 | Laamanen | ........... | H04B 10/272 370/463 |
| 7,929,862 B2 * | 4/2011 | Hakomori | .............. | H04B 10/85 398/158 |
| 9,143,234 B2 * | 9/2015 | Campos | ................. | H04B 10/27 |
| 9,300,399 B2 * | 3/2016 | Campos | ............. | H04B 10/2504 |
| 9,526,020 B2 * | 12/2016 | Berlin | ................ | H04W 72/0453 |
| 2002/0075539 A1 * | 6/2002 | Iida | ..................... | H04J 14/0298 398/72 |
| 2002/0080448 A1 * | 6/2002 | Kim | ................. | H04B 10/25753 398/115 |
| 2005/0151215 A1 | 7/2005 | Hauhe | | |
| 2006/0172775 A1 | 8/2006 | Conyers | | |
| 2010/0278530 A1 | 11/2010 | Kummetz | | |
| 2010/0296816 A1 | 11/2010 | Larsen | | |
| 2011/0176809 A1 * | 7/2011 | Hakomori | ............ | H04B 10/85 398/79 |
| 2011/0268446 A1 | 11/2011 | Cune | | |
| 2011/0268452 A1 | 11/2011 | Beamon | | |
| 2012/0057572 A1 | 3/2012 | Evans | | |
| 2012/0269509 A1 | 10/2012 | Hultermans | | |
| 2013/0004173 A1 * | 1/2013 | Maricevic | ............... | H04L 27/34 398/76 |
| 2013/0114963 A1 | 5/2013 | Stapleton | | |
| 2013/0265117 A1 | 10/2013 | Ng | | |

FOREIGN PATENT DOCUMENTS

| | | |
|---|---|---|
| TW | 201210230 | 3/2012 |
| WO | 2009143176 | 11/2009 |
| WO | 2012115843 | 8/2012 |
| WO | 2014048866 | 4/2014 |
| WO | 2014048919 | 4/2014 |

OTHER PUBLICATIONS

Office Action in related U.S. Appl. No. 14/431,290, dated Apr. 7, 2016.
Office Action in related SE Patent No. 1200578-1, dated May 20, 2015; pp. 1-9.
International Search Report and Written Opinion dated Dec. 10, 2013 for related application No. PCT/EP2013/069685.
S.H. Lee et al, Reduction of inter-channel crosstalk using Mach-Zehnder type filter in digital/RF optical transmission link, IEE Proceedings online No. 20045066, IEE Proc.-Optoelectron., vol. 152, No. 4, Aug. 2005 pp. 189-192.
Office Action in related SE1200578-1, dated Apr. 23, 2013, pp. 1-6.
Response submitted Oct. 22, 2013, pp. 1-15, to Office Action in related SE1200578-1 dated Apr. 23, 2011.
Office Action in related SE1200578-1, dated Oct. 1, 2014, pp. 1-6.
Response submitted Jan. 29, 2015, pp. 1-31, to Office Action in related SE1200578-1 dated Oct. 1, 2014.
International Search Report and Written Opinion dated Dec. 10, 2013 for related application No. PCT/EP2013/069847.
Office Action in related U.S. Appl. No. 14/431,301, dated Mar. 9, 2016.
Notice of Allowance dated Jan. 1, 2017 for U.S. Appl. No. 14/431,301.
Office Action in related EP App. No. 13 770 438.3-1857, dated Dec. 23, 2016.
Office Action in related EP App. No. 13 766 057.7-1857, dated Dec. 21, 2016.
Summons to Attend Oral Proceedings for related EP 13770438.3, dated Nov. 7, 2017.
Summons to Attend Oral Proceedings for related EP 13766057.7, dated Nov. 7, 2017.
Office Action dated Dec. 12, 2017 for related TW App. No. 102134731.
Office Action dated Nov. 11, 2017 for related TW App. No. 102134736.

\* cited by examiner

COMMUNICATION SYSTEM FOR ANALOG AND DIGITAL COMMUNICATION SERVICES

CROSS-REFERENCE TO RELATED APPLICATIONS

This application is a continuation of the U.S. National Phase application Ser. No. 14/431,301 filed Mar. 25, 2015, which claims priority to the International Patent Application No. PCT/EP2013/069847 filed Sep. 24, 2013, which claims priority to both U.S. Provisional Application No. 61/705,913 entitled "Distribution Network for a Distributed Antenna System" filed on Sep. 26, 2012, and Swedish Patent Application No. 1200578-1 entitled "Distribution Network for a Distributed Antenna System" filed on Sep. 26, 2012, all of the above listed applications are incorporated by reference herein.

FIELD OF THE INVENTION

The present invention relates to transmission of streams of digital and analog information by means of interconnection units, a communication system comprising such units, corresponding methods in said units, and a computer program product.

BACKGROUND OF THE INVENTION

There is a very large, and still rapidly growing, demand for wireless communication services today. Mobile telephone services are used to a very large extent, e.g. for telephone conversations and text messages. Also, high speed wireless communication is used for a large number of applications, such as internet browsing, streaming of music, films and/or television, and the like.

Since the demand for wireless communication services is very high, and the end users expect the wireless services to be available essentially everywhere they go, the wireless communication system coverage must cover very large geographical areas, both indoors and outdoors, and also provide high bitrates in these areas.

Traditionally, radio base stations, such as Base Transceiver Stations (BTS) and/or NodeBs and/or eNodeBs, hereinafter called Remote Unit Controllers (RUC), are typically located very close to a tower comprising one or more tower-mounted antennas. Said RUCs are provided with all the circuitry necessary for sending and receiving the wireless communication signals to and from the mobile equipments connecting to it, such as Mobile Stations (MS) or User Equipments (UEs). The radio base stations have typically been arranged in cells. The traditional radio base stations include both the circuitry to receive and transmit signals from and to a core network and to receive and transmit signals from and to the one or more antennas, including radio frequency (RF) circuits and power amplifiers.

However, since the end users nowadays expect the high speed wireless communication services, such as mobile telecommunication services, wireless fidelity networks (WiFi), and Wireless Local Area Networks (WLANs), to be available essentially everywhere, it would be very costly to build traditional radio base stations at every site where coverage and high bitrates are needed. Also, in indoor locations, such as in malls, railway tunnels, road tunnels, restaurants, café s, airports, conference centers, tunnels, stadiums and exhibition halls, the traditional radio base station concept results in poor service coverage and bitrates.

Further, such systems have to be installed, maintained, monitored and controlled. Also, each one of these systems have to be provided with power supplies, distribution networks, locations for mounting radio base stations, control units and antenna arrangements. Thus, to provide sufficient coverage and bitrates today is very costly, and it is also very work and time consuming to monitor and maintain all of these different systems.

AIM AND MOST IMPORTANT FEATURES OF THE INVENTION

It is an object of the present invention to provide a more efficient and cost and space effective communication system.

Accordingly, the invention provides a first and a second interconnection unit, a system comprising said units, as well as a method in said respective units, having features set forth in the independent claims. Advantageous embodiments of the invention are defined by the dependent claims.

Hence, according to a first aspect of the present invention, a first interconnection unit is provided. The first interconnection unit comprises a first and a second communication interface, a first and a second electro-optical converter and a multiplexing unit. During operation, the first communication interface receives a first stream of electrically transmitted analog information, which is converted at the first electro-optical converter into a first stream of optically transmitted analog information. Further, the second communication interface receives a first stream of electrically transmitted digital information which is converted at the second electro-optical converter into a first stream of optically transmitted digital information. The first stream of optically transmitted analog information and the first stream of optically transmitted digital information are then multiplexed at the multiplexing unit and output over a bidirectional link.

According to a second aspect of the present invention, a second interconnection unit is provided, which comprises a first and a second communication interface, a first and a second electro-optical converter and a multiplexing unit. The first interconnection unit is adapted such that a multiplexed first stream of optically transmitted analog information and first stream of optically transmitted digital information, transmitted over a bidirectional link, is received and de-multiplexed at the multiplexing unit. The first stream of optically transmitted analog information and first stream of optically transmitted digital information are then converted at the first electro-optical converter into a first stream of electrically transmitted analog information, whereas the first stream of optically transmitted digital information is converted at the second electro-optical converter into a first stream of electrically transmitted digital information. The first stream of electrically transmitted analog information is output at the first communication interface and the first stream of electrically transmitted digital information is output at the second communication interface.

According to a third aspect of the present invention, a method in the first interconnection unit according to the first aspect is provided. In the method, a first stream of electrically transmitted analog information is received and converted into a first stream of optically transmitted analog information. Further, a first stream of electrically transmitted digital information is received and converted into a first stream of optically transmitted digital information. The converted streams of analog and digital information are then multiplexed and output over a bidirectional link.

According to a fourth aspect of the present invention, a method in the second interconnection unit according to the second aspect is provided. In the method, a multiplexed first stream of optically transmitted analog information and first stream of optically transmitted digital information transmitted over a bidirectional link is received and de-multiplexed. The first stream of optically transmitted analog information is then converted and output as a first stream of electrically transmitted analog information. The first stream of optically transmitted digital information is converted into a first stream of electrically transmitted digital information, and output.

According to a fifth aspect of the present invention, a system comprising a first interconnection unit according to the first aspect and a second interconnection unit according to the second aspect is provided, the system being adapted to perform a method according to the third and fourth aspects of the present invention.

By the term "stream of information" should be understood communication signals, or a communication link, carrying e.g. analog or digital information between a transmitting unit, such as e.g. core network, and a receiving unit, such as e.g. a mobile station or user equipment. The information may e.g. be optically or electrically transmitted between the units.

The optically transmitted information may be divided into a first and a second portion of an optical spectrum, wherein the first portion of the spectrum may be allocated for carrying analog information and the second portion allocated for carrying digital information. The first and second portions may be separated such that the first portion employs a set of frequencies not being employed by the second portion of the spectrum. The first and second portions of the spectrum may e.g. be realized by a first and a second laser of different colors.

The communication system, which also may be referred to as a distribution network, is adapted to transmit multiplexed streams of analog and digital information over the bidirectional link, which e.g. may be an existing optical fiber or be included in the communication system.

The interconnection unit and corresponding method according to the first and third aspects is advantageous in that streams of both digital and analog information can be combined and transmitted over a single link, such as a fiber. Being able to supply both analog and digital communication services over a single fiber is advantageous as the access to available fibers, which may be owned and operated by third parties, often may be scarce and/or expensive. Further, using a single first and/or second interconnection unit for transmitting streams of information over the fiber advantageously reduces the space and equipment required for mounting, service, monitoring, and power supply as compared with prior art radio base station systems The total weight of, and wind forces caused by, these units can also be reduced by the integrated implementation of the units.

By using the interconnection units and corresponding methods, the digital and analog information, which is transmitted over the bidirectional link, may advantageously be de-multiplexed and output to the respective communication services in the form of electrical signals. Thereby digital and analog services may be supplied with streams of information that have been transmitted over a common link, such as a single fiber. By integrating the multiplexing unit and the electro-optical converters in the interconnection unit the space required for mounting and installation may be reduced. Further, service, power supply and monitoring may be facilitated as compared with traditional radio bases systems.

According to embodiments, the first interconnection unit and related method may be further adapted to receive, at the multiplexing unit, a multiplexed second stream of optically transmitted analog information and second stream of optically transmitted digital information transmitted over the bidirectional link. Said received information is then de-multiplexed at the multiplexing unit and converted, at the first and second electro-optical converter, into a second stream of electrically transmitted analog and digital information, respectively. The second stream of electrically transmitted analog information is output at the first communication interface, whereas the second stream of optically transmitted digital information is output at the second communication interface.

This also applies, mutatis mutandis, on the second interconnection unit and corresponding method, wherein a second stream of electrically transmitted analog information and a second stream of electrically transmitted digital information are received, converted, multiplexed, and output accordingly.

An interconnection unit able of both outputting and receiving multiplexed analog and digital information over the bidirectional link advantageously allows for both uplink and downlink communication. The communication over the bidirectional link may e.g. be full-duplex, wherein a first and a second stream of optically transmitted analog and/or digital information may be simultaneously transmitted in both directions, or half-duplex wherein said first and second streams of information may be transmitted in both directions, but only one direction at a time.

The system according to the fifth aspect is advantageous in that it provides a communication system capable of simultaneously supplying a wide range of both analog and digital communication services with communication signals over a single fiber. The communication system may e.g. be combined with an existing analog RF system in order to enable digital systems, such as WLANs, to be added to the architecture. Combining digital and analog systems in the same architecture, e.g. using a single first connection unit and/or a single second connection unit, is advantageous at locations having certain requirements regarding e.g. mounting space, weight, visual appearance (in terms of number of visual units), government permits, etc. By integrating both digital communication services and analog communication services in the communication system the power consumption, weight, and volume of the hardware may be reduced and hence the installation, service, and monitoring may be facilitated.

The communication system, or distribution network, and the methods for transmitting analog and/or digital streams of information, or signals, according to the present invention are based on the realization that the spectrum of the signals can be divided into at least two parts, wherein the first part of the spectrum is allocated for transmission of at least one stream of analog information, such as an RF link for a distributed antenna system (DAS), e.g. RF over fiber for an embodiment of the present invention utilizing a fiber based communication network in the DAS. Further, at least one second part of the spectrum may be allocated for transmission of at least one stream of digital information, or a digital link. This at least one digital link can e.g. be utilized for supplying digital communication signals for at least one RRH unit and/or at least one Wireless Local Area Network (WLAN) unit and/or at least one pico base station and/or at least one femto base station and/or at least one remote Ethernet unit.

Transmission of both analog RF communication for services including e.g. a DAS, and digital communication for e.g. one or more of at least one RRH unit, at least one WLAN unit, at least one pico base station, at least one femto base station and at least one remote Ethernet unit thus enabled which advantageously provides an efficient and cost effective utilization of the distribution network, or communication system. Also, an overall low cost communication system, which can supply a number of services in parallel, is provided.

According to an embodiment, the multiplexing unit may be a wavelength division unit applying wavelength division multiplexing, WDM, on the spectrum of the streams of optically transmitted analog and digital information such that each separate part of the spectrum utilizes a number of wavelengths being separate from wavelengths being utilized by other separate parts of the spectrum. Thus, the first part of the spectrum employs a first set of wavelengths and the at least one second part of the spectrum employs at least one second set of wavelengths, wherein the first and at least one second sets of wavelengths are separate from each other.

According to an embodiment of the present invention, the multiplexing units may apply frequency division multiplexing, FDM, on the spectrum of the streams of optically transmitted analog and digital information, such that each separate part of the spectrum uses a number of frequencies being separate from frequencies being used by other separate part of the spectrum. Thus, the first part of the spectrum employs a first set of frequencies and the at least one second part of the spectrum employs at least one second set of frequencies, wherein the first and at least one second sets of frequencies are separate from each other.

Also, by different embodiments of the present invention, the communication system may comprise, or be adapted to supply with signals, a DAS having one or more Remote Unit Controllers, RUC, each possibly being utilized by one operator/service provider and adapted to provide a stream of electrically transmitted analog information, such as RF signals, to the first interconnection unit which outputs the information over the bidirectional link to the second interconnection unit. The second interconnection unit may then distribute the RF signals to one or more Remote Units, RUs, which may be integrated in the second interconnection unit, and antenna arrangements being located at suitable locations for proving coverage and sufficient bitrates where the demand is.

According to embodiments of the present invention, the communication system is adapted to transmit further optical signals e.g. supplying a remote radio head unit or an Ethernet unit. The optical signals may comprise analog and/or digital information. As an example, a first optical signal may be received by the first interconnection unit and directly transmitted to the multiplexing unit, at which the first optical signal is multiplexed and transmitted over the bi-directional link together with the streams of optically transmitted analog and digital information. The multiplexed first optical signal may then be received at the second interconnection unit, de-multiplexed at the multiplexing unit and output from the second interconnection unit. The optical signal can be transmitted without passing an electro-optical converter. The communication system may also be adapted to transmit a second optical signal in the other direction, i.e. receiving the second optical signal at the second interconnection unit, at which it is multiplexed and output over the bi-directional link to the first interconnection unit, wherein the signal is de-multiplexed and output.

According to an embodiment, the communication system is adapted to utilize a Common Public Radio Interface, CPRI, communication protocol and/or an Open Base Station Architecture Initiative (OBSAI) communication protocol during transmission of the first and/or second optical signal (s).

According to embodiments of the present invention, at least one or more in the group of: a RRH unit, a WLAN unit; a pico base station; a femto base station; a remote Ethernet unit; or a combination thereof, may be integrated in a RU of the DAS.

This has a number of integration advantages regarding e.g. network costs, mounting costs and power supplies. The total weight of, and wind forces caused by, these units can also be reduced by the integrated implementation of the units in the DAS RUs.

According to an embodiment of the present invention, the first part of the signal spectrum may convey analog RF signals for the one or more RUs of the DAS and the second part of the spectrum may convey digital RRH communication signals for the RRH units.

According to an embodiment of the present invention, the first part of the signal spectrum may convey RF DAS signals for the one or more DAS RUs and the second part of the spectrum WiFi/WLAN communication signals. The analog DAS RF signals and the digital WiFi/WLAN communication signals may be diplexed and transmitted over the distribution network.

The invention may be embodied as computer-readable instructions for controlling a programmable computer in such manner that it performs the method according to the third and fourth aspects outlined above. Such instructions may be distributed in the form of a computer-program product comprising a computer-readable medium storing the instructions.

Further objectives of, features of and advantages with the present invention will be apparent when studying the following detailed disclosure, the drawings and the appended claims. Those skilled in the art realize that different features of the present invention, even if recited in different claims, can be combined in embodiments other than those described in the following.

BRIEF DESCRIPTION OF THE DRAWINGS

The above, as well as additional objects, features and advantages of the present invention, will be better understood through the following illustrative and nonlimiting detailed description of embodiments of the present invention. Reference will be made to the appended drawings, on which.

DETAILED DESCRIPTION OF PREFERRED EMBODIMENTS

Figure 1:
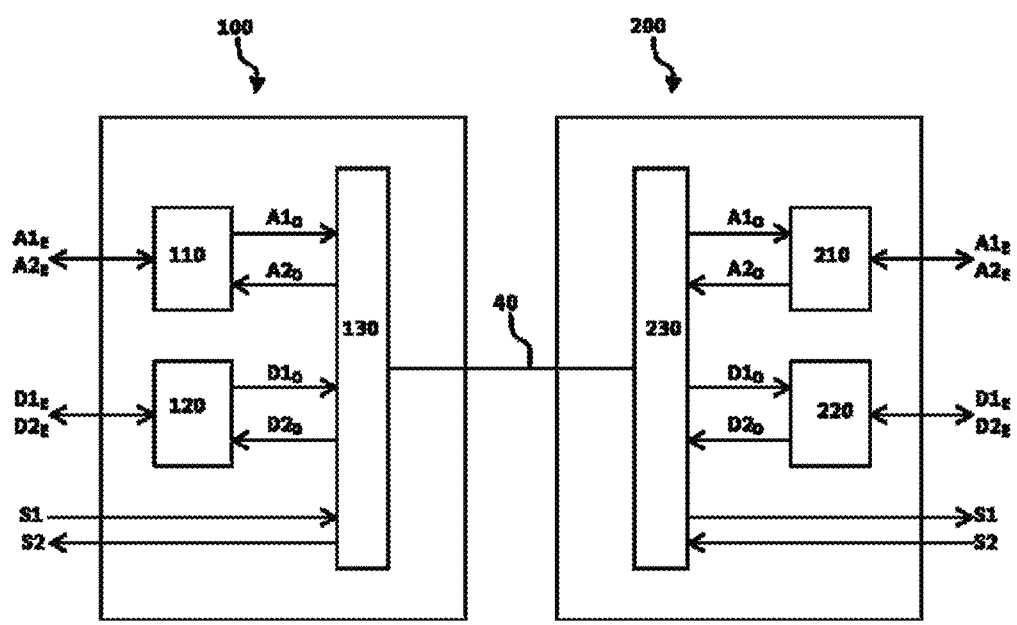
FIG. 1 shows a communication system according to an embodiment of the present invention.

FIG. 1 shows a communication system comprising a first interconnection unit 100 and a second communication unit 200 according to an embodiment of the present invention. The first and second interconnection units 100, 200 are adapted to transmit analog and digital information over a bidirectional link, such as e.g. a optical fiber 40, so as to supply analog and digital communication services with communication information.

As indicated in FIG. 1, the first interconnection unit 100 comprises a first and a second electro-optical converter 110, 120 and a multiplexing unit 130. Further, the second interconnection unit 200 comprises a corresponding first and second electro-optical converter 210, 220 and a multiplexing unit 230. During operation, a first stream of electrically transmitted analog information $A1_E$ may be received at a first communication interface of the first interconnection unit 100, converted into a first stream of optically transmitted analog information $A1_O$ at the first electro-optical converter 110, and transmitted to the multiplexing unit 130. Further, a first stream of electrically transmitted digital information $D1_E$ may be received at a second communication interface of the first interconnection unit 100, converted into a first stream of optically transmitted digital information $D1_O$ at the second electro-optical converter 120, and transmitted to the multiplexing unit 130. At the multiplexing unit 130, the first stream of optically transmitted analog information $A1_O$ and the first stream of optically transmitted digital information $D1_O$ may be multiplexed with a first optical signal $S_1$, comprising e.g. digital and/or analog information, so as to enable transmission over the bidirectional link 40. The first streams of optically transmitted analog and digital information $A1_O$, $D1_O$ and the first optical signal $S_1$ may each be comprised within separate parts of an optical spectrum. The multiplexing unit, e.g. an optical WDM unit, may utilize WDM on the spectrum such that each separate part of the spectrum employs a set of wavelengths being separate from wavelengths being employed by other separate parts of said spectrum.

The output from the bidirectional link 40 may then be received at the second interconnection unit 200, wherein the multiplexed first streams of optically transmitted analog and digital information $A1_O$, $D1_O$ and first optical signal $S_1$ may be de-multiplexed. The first optical signal $S_1$ may then be output from the second interconnection unit 200, whereas the first stream of optically transmitted analog information $A1_O$ and the first stream of optically transmitted digital information $D1_O$ are converted at the first and second electro-optical converters 210, 220 into a first stream of electrically transmitted analog information $A1_E$ and a first stream of electrically transmitted digital information $D1_E$, respectively, prior to being output at the first and second communication interface, respectively.

The transmission of information from the first interconnection unit 100 to the second interconnection unit 200 may be referred to as downlink communication, e.g. supplying Remote Radio Head, RRH units, Wireless Local Area Network, WLAN, units pico base stations, femto base stations, and remote Ethernet services with information. The analog information of the downlink communication may e.g. comprise downlink RF signals for existing cellular and/or safety systems, such as e.g. downlink of TETRA, iDEN, 850, 900, DCS1800, PCS1900, AWS, UMTS etc.

As shown in FIG. 1, the system may also be adapted to transmit information from the second interconnection unit 200 to the first interconnection unit 100, which also may be referred to as uplink communication. During uplink communication, a second stream electrically transmitted analog information $A2_E$ may be received at a first communication interface of the second interconnection unit 200, converted into a second stream of optically transmitted analog information $A2_O$ at the first electro-optical converter 210, and transmitted to the multiplexing unit 230. Further, a second stream of electrically transmitted digital information $D2_E$ may be received at a second communication interface of the second interconnection unit 200, converted into a second stream of optically transmitted digital information $D2_O$ at the second electro-optical converter 220, and transmitted to the multiplexing unit 230. At the multiplexing unit 230, the second stream of optically transmitted analog information $A2_O$ and the second stream of optically transmitted digital information $D2_O$ may be multiplexed with a second optical signal $S_2$, comprising e.g. digital and/or analog information, so as to enable transmission over the bidirectional link 40.

The output from the bidirectional link 40 may then be received at the first interconnection unit 100, wherein the multiplexed second streams of optically transmitted analog and digital information $A2_O$, $D2_O$ and second optical signal $S_2$ may be de-multiplexed. The second optical signal $S_2$ may then be output from the first interconnection unit 100, whereas the second stream of optically transmitted analog information $A2_O$ and the second stream of optically transmitted digital information $D2_O$ are converted at the first and second electro-optical converters 110, 120 into a second stream of electrically transmitted analog information $A2_E$ and a second stream of electrically transmitted digital information $D2_E$, respectively, prior to being output at the first and second communication interface, respectively.

The communication system as described with reference to FIG. 1 enables downlink and uplink communication for analog services such as e.g. radio base stations including e.g. a BTS or an eNodeB, and digital services such as e.g. an IP backbone, Ethernet, or the like. The system may support analog services within the RF bandwidth of the electro-optical converter, and a large variety of digital communications, packet switching and circuit switching. As long as the bit rate is within the bandwidth of the electro-optical converter, the communication system may work both with applications that need an uplink and a downlink channel as well as applications that use TDMA.

Figure 2:
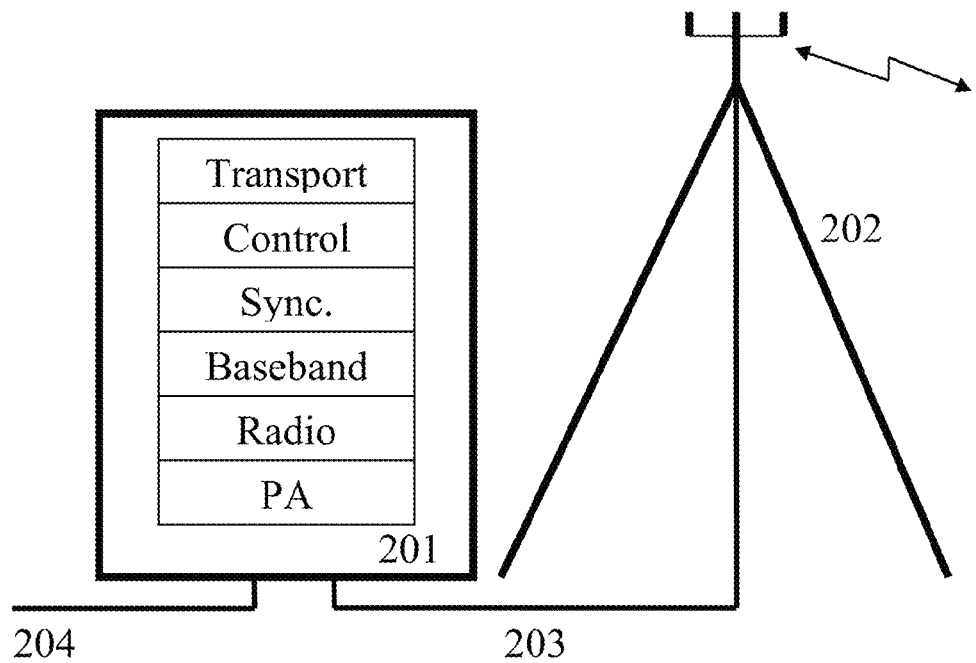
FIG. 2 shows a base station configuration.

FIG. 2 shows a radio base station 201 in a prior art communication system, wherein the radio base station 201 is located close to a tower 202 being connected to a base station 201 by a cable 203, where the cable 203 often is a coaxial cable. The tower 202 has one or more antenna arrangements and the radio base station 201 and the one or more antenna arrangements provide coverage for a cell in the system. The radio base station 201 is connected to the core network 204. In the radio base station 201, circuitry for handling the signals of the transport layer, the control layer, the synchronization layer, the baseband layer and the radio layer are arranged. Also, power amplifiers are arranged within the radio base station 201. Thus, the radio base station 201 provides RF signals to the antenna in the tower 202. Possibly, a Tower Mounted Amplifier (TMA) is required in the tower 202 due to losses in the cable 203 from the base station circuitry in the radio base station 201 to the one or more antenna arrangements in the tower 202. The cells, each being covered by such a radio base station 201, have traditionally been planned and located side by side with other cells such that an acceptable coverage of a geographical area is achieved. A drawback with such prior art communication system is that it would be very costly to build such radio base stations at every site where coverage and high bitrates are needed.

The communication system according to the embodiment as described with reference to FIG. 1 is advantageous over such prior art system since the communication system enables a physical separation of the spatially large and power consuming base station circuitry from the one or more antenna arrangements. For example, in environments where the space is limited and/or where power supply is limited or costly to provide, it can be very advantageous to place the remote unit controllers, RUCs, which e.g. may be integrated in the first interconnection unit 100, at a location, possibly a central location, where space and power are available, and then distribute the remote units, RUs, which may be integrated in the second interconnection unit 200, to locations where coverage and high bitrates are needed, but where there is a shortage in space and/or power supply. This also reduces the installation costs, since the more bulky and space consuming RUC can be placed where there is plenty of room, which usually results in a lower rent for the premises.

The communication system according to the present embodiment is also esthetically advantageous over prior art systems, since the smaller RUs can easily be designed e.g. to fit into the interior of a mall, an airport or the like. The operation and maintenance costs can also be significantly reduced when the communication system according to the present invention is utilized, since maintenance is easier, and therefore also less costly, in one convenient RUC location having more space, and possibly being located centrally, than in a large number of possibly less convenient distributed RU locations.

If the bidirectional link 40 is chosen and set up properly, the RUs can be spaced long distances apart from the RUC, functional distances of tens of kilometers can be reached, such that very large geographical areas can be covered by the communication system according to the present embodiment.

Also, smaller cells such as pico cells and femto cells may be used with the communication system, which may increase coverage and bitrates, and lower the costs. The micro base stations and pico base stations may be integrated in the communication system according to the present embodiment, or be standalone radio base stations that are supplied with communication information from the communication system. They may be deployed such that coverage and bitrates can be optimized for the geographical area of the communication system, both outdoors and indoors.

Figure 3:
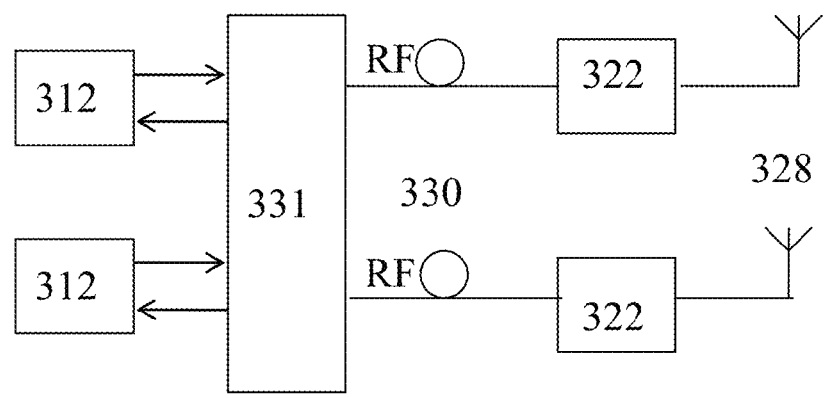
FIG. 3 shows a distributed antenna system, DAS.

FIG. 3 illustrates an example of a Distributed Antenna System, DAS which may form a part of an embodiment of the present invention. Here, one or more Remote Unit Controllers (RUC; 312), each possibly being utilized by one operator/service provider and providing one system and/or service, are being connected to a RUC interface 331, which e.g. may be the multiplexing unit as described with reference to FIG. 1. The RUC interface 33 is arranged for providing an interface for one or more RUC 312 and/or one or more fiber cables 330. As mentioned above, typically, the one or more RUCs 312 are radio base stations, such as a BTS or an eNodeB or the like of the type being described above in connection with FIG. 1. These radio base stations provide RF signals to the RUC interface 331.

The RUC interface 331 then combines the RF signals from each of the RUs and provides these combined RF signals to one or more fiber cables 330. Thus, the combined RF signals being provided to the fiber cable 330 may include a one or more of RF signals related to a number one or more services and/or service providers. The fiber cable 330 can then distribute the RF signals to one or more Remote Units (RU; 322) and antenna arrangements 328, being located at suitable locations for proving coverage and sufficient bitrates where the demand is.

It will be understood that the DAS of FIG. 3, which is adapted for transmitting analog information, may be combined with the communication system of FIG. 1 so as to enable transmission of both analog and digital information. Thereby both analog and digital service may be supplied by the same communication system and over one or several common fibers 330.

Figure 4:
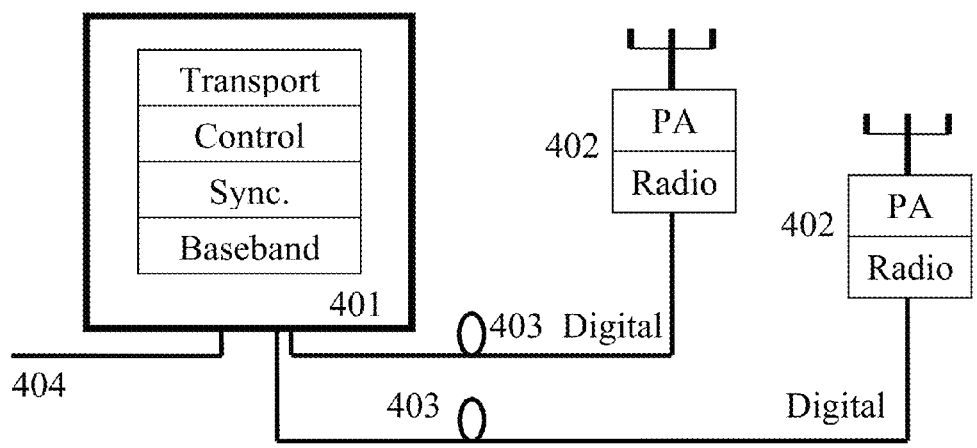
FIG. 4 shows a remote radio head, RRH configuration.

FIG. 4 shows a Remote Radio Head (RRH) concept. The RRH concept breaks up the prior art radio base station architecture into a possibly centrally located processing facility, which in this document will be called RRH controller, and one or more distributed antennas units, in this document called RRH units, being connected to the processing facility through a network preferably having a high bandwidth.

Here, the prior art radio base station processing equipment except the radio frequency processing equipment and the power amplification equipment are located in the RRH controller, whereas the radio frequency processing equipment and power amplification equipment are located in the distributed RRH units.

In the example of FIG. 4, the RRH controller 401 is arranged as a distribution node. The RRH controller 401 can be located centrally in the network and can also be implemented as a base station hotel. The RRH controller 401 comprises circuitry for handling the signaling of the transport layer, the control layer, the synchronization layer, and the baseband layer.

Figure 5:
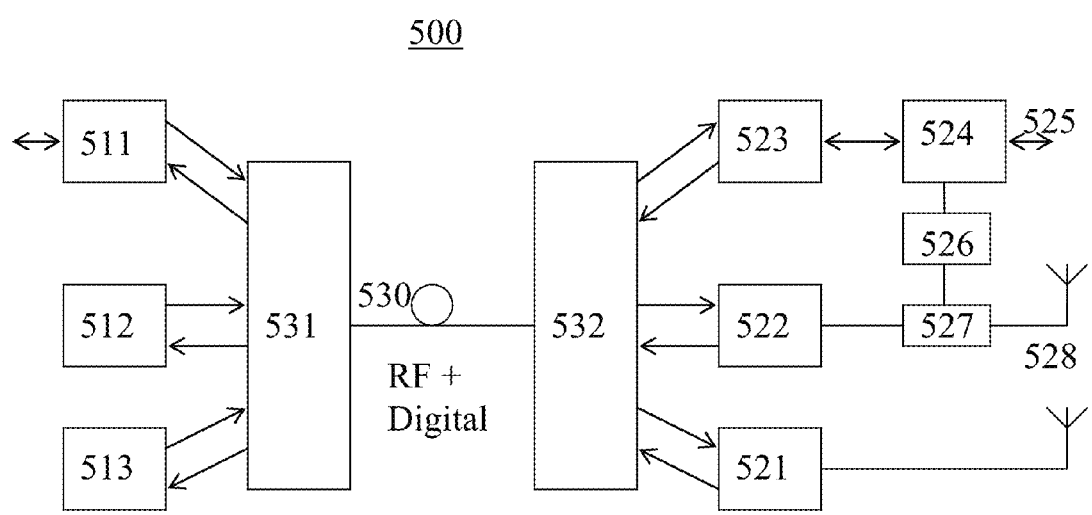
FIG. 5 shows a communication system according to an embodiment of the invention.

The RRH controller 401 is connected to the distributed RRH units 402 by a preferably high bandwidth distribution network 403. The distribution network 403 provides a digital link between the RRH controller 401 and the RRH units 402. The RRH controller 401 is further connected to the core network 404. The distributed RRH units 402 comprise the radio layer circuitry and power amplifiers. In FIG. 4, the number of distributed RRH units 402 has been limited to two RRH units 402 to enhance the intelligibility of the FIG. However, a large number of distributed RRH units can be connected to the RUCs. FIG. 5 schematically shows a Distributed Antenna System (DAS) 500, which utilizes an embodiment of the present invention. In the DAS 500, one or more RUC 512, each possibly being utilized by one operator/service provider and providing one system and/or service, are connected to a first interconnection unit including a multiplexing unit 531, and a corresponding second interconnection unit comprising a remote, or second, multiplexing unit 532 being connected to each other by bidirectional connection 530 (also referred to as a distribution network). The remote multiplexing unit 532 is arranged for de-multiplexing signals having been transmitted over the bidirectional connection 530 from RUCs 512 via the multiplexing unit 531, and for multiplexing signals from one or more RUs 522, being connected to the remote multiplexing unit 532, that are to be transmitted to the multiplexing unit 531. Thus, in the DAS 500 according to an embodiment of the invention, the one or more RUCs 512, the interconnection units 531, 532 and the one or more active RUs 522 forms a DAS system, as described above, which provides information between the one or more RUCs 512 and the one or more RUs 522 via RF signals over the bidirectional link 430.

Thus, the DAS 500 provides signals between the at least one RUC 512 and the at least one active RU 522. The active at least one active RU 522 includes the RF circuitry needed for transmitting and receiving analog RF signals, such as one or more filters, one or more mixers, one or more amplifiers and/or power amplifiers. The at least one active RU 522 is connected to one or more antenna arrangements 528. Thus, the RUCs 512 includes the baseband circuitry, while the RUs 522 include the RF circuitry.

The spectrum of the signals is, according to the present embodiment, divided into at least two parts. The first part of the spectrum is allocated for transmission of at least on RF link, i.e. for transmission of RF signals, between the at least one RUC 512 and the at least one active RU 522. Thus, the first part of the signal spectrum is utilized for RF transmission within the DAS. For example, the first part of the spectrum conveys RF over fiber for an embodiment of the present invention utilizing a fiber based communication network as the bidirectional link 530.

According to an embodiment of the present invention, the at least one second part of the spectrum is allocated for transmission of at least one digital link, or stream of optically transmitted digital information, where this second part is separated from the first part, e.g. by a multiplexing method, as will be described more in detail below. This at least one digital link can be utilized for supplying digital communication signals for at least one RRH unit 521 and/or at least one Wireless Local Area Network (WLAN) unit 526 and/or at least one pico base station and/or at least one femto base station and/or at least one remote Ethernet unit 523.

The RRH units 521 may communicate with the RRH controllers 513 over the at least one digital link, wherein the RRH controller 513 may include a Base Band Unit (BBU) being arranged for performing all of the base band processing needed for communication with the mobile equipment utilizing the mobile services being provided by the RRH unit 521. The RRH units may include the circuitry for performing all the above described RF processing, and amplification of transmitted signals and reception of received signals, but may not necessarily include e.g. the base band circuitry, which is located in the RRH controller 513, as has been described above. Signals are here transmitted and received over the air interface by the at least one antenna arrangement 528.

The RRH units 521 can be signaled to over a standardized protocol, such as a Common Public Radio Interface (CPRI) protocol, or an Open Base Station Architecture Initiative (OBSAI) protocol. The standardized protocol is used for conveying digital communication between the RRH controllers 513 and the RRH units 521 over the digital link.

The at least one remote Ethernet unit 523 may communicate with at least one Ethernet unit 511 over the at least one digital link. The at least one Ethernet unit 511 provides a connection to the core network, e.g. via an Ethernet and/or optical fiber connection.

Thus, according to the present embodiment, both at least one analog RF link for DAS communication and at least one digital link for communication with one or more of at least one RRH unit 521, at least one WLAN unit 526, at least one pico base station, at least one femto base station, and at least one remote Ethernet unit 523 are provided by the communication system, or distribution network 530, 531, 532. The distribution network 530, 531, 532 can here include technologies and/or one or more cables or fibers, which will be explained more in detail below.

The present embodiment thus provides a communication system in which a DAS can be implemented in parallel with one or more of RRH, WLAN, pico/femto base stations and Ethernet. In other words, the analog RF link of the DAS can, according to the present embodiment, share the spectrum of the signals over the distribution network 530, 531, 532 with the digital link that can be used for providing the services being implemented in parallel with the DAS.

This has a number of advantages. Since the spectrum of the distribution network here can be shared by the analog RF link and the digital link, the total costs for distribution networks is lowered as compared with architectures wherein the DAS, the RRH, the WLAN, and the Ethernet basically each has to use one separate distribution network, which is, of course, expensive. Also, since one single distribution network can be utilized for providing both the analog RF links and the digital links, only one power supply for this single distribution network is needed.

Further, the DAS has a well working monitoring and maintenance system, which, according to the present invention can be utilized for monitoring and maintenance of essentially all of the DAS units, and of the units for the RRH service, the WLAN service, the pico/femto cells, and the Ethernet service.

By utilization of the present embodiment, combined signals over of the bidirectional link 530 of both analog RF link transmission for the RUs 522 and the digital link transmission for, e.g. for the RRH units 522 according to a standardized protocol can be performed. Hereby a very efficient utilization of the bidirectional link 530 is achieved, which also is cost effective since an open standardized protocol is used for the digital RRH transmission and since transmission for multiple services can be jointly performed on the bidirectional link 430.

According to an embodiment of the present invention, the signal spectrum for the signals transmitted by the communication system may be divided into a first part, and two second parts. These first and two second parts of the spectrum are arranged separately from each other, i.e. they are disjunctive. Here, the first and second parts are used for conveying RF signals for the one or more RUs 522, digital communication according to the standardized protocol for the one or more RRHs 521, and digital Ethernet communication signals, respectively. The Ethernet communication signals are provided to and from at least one remote Ethernet unit 523. The remote Ethernet unit 523 is connected to a switch 524 for providing the digital Ethernet communication signals to and from the mobile equipment of the end users via e.g. a coaxial cable, a fiber or the like 525. A skilled person realizes that essentially any suitable network technology and/or protocol resembling Ethernet can be implemented according to the embodiment of the present invention. Thus, the remote Ethernet unit 523, could be exchanged by essentially any other remote unit utilizing such a suitable network technology and/or protocol.

By utilization of this embodiment of the invention, the distribution network 530, 531, 532 can via the remote Ethernet unit 523 convey e.g. a high speed connection, such as an internet connection, to the end users in the DAS 500, in parallel with the other services being provided by the DAS 500.

According to an embodiment of the present invention, the first part of the signal spectrum for the signals being performed over the distribution network 530, 531, 532 conveys analog RF signals for the one or more RUs 522 of the DAS and the second part of the spectrum conveys digital RRH communication signals for the RRH units 521. Thus, the analog RF signals for the RUs 522 and the digital RRH communication signals are here and transmitted over the distribution network 530, 531, 532.

According to an embodiment of the present invention, the first part of the spectrum for the signals transmitted over the distribution network 530, 531, 532 conveys RF DAS signals for the one or more RUs 522 and the second part of the spectrum conveys wireless fidelity (WiFi) communication signals. Thus, the analog RF signals for the RUs 522 and the digital WiFi/WLAN communication signals are diplexed and transmitted over the distribution network 530, 531, 532.

Thus, the RF DAS signals and the WiFi signals being intended for the mobile equipment are merged by diplexing in the multiplexing unit 531 for providing a diplexed spectrum, and are then possibly further multiplexed with the other parts of the spectrum in the multiplexing unit 531. Thereafter, the multiplexed signal, including at least the first and second parts of the spectrum is conveyed over the distribution network 530, 531, 532. In the remote multiplexing unit 532, the multiplexed signal, including at least the first and second parts of the spectrum, is de-multiplexed in the remote multiplexing unit 532, whereby the diplexed first and second parts of the spectrum, and possibly also other parts of the spectrum, are retrieved. Thereafter a signal corresponding to the diplexed first and second parts of the spectrum are provided to the at least one RU 522.

In the at least one RU 522, the necessary RF signal processing, e.g. amplification, is performed on the signal corresponding to the diplexed first and second spectrum parts, and the signal is provided to a remote diplexing unit 527. In the remote diplexing unit 527, the RF signals being intended for the at least one antenna arrangement 528 and the WiFi signals are separated, such that the RF signals are provided to the at least one antenna arrangement 528 and the WiFi signals are provided to the remote WiFi unit 526.

According to an embodiment of the present invention, the one or more RRH units 521 are integrated in the one or more RUs 522 of the DAS itself. Thus, the RRH units 521 are physically located in the same casing as the RUs 522. Hereby, the RRHs do not have to be mounted as separate units, which can reduce the installation work and thereby the installation costs. Also, since no mounting of RRH units as separate units e.g. on houses, poles, masts and the like, is needed, reduced costs for rental of space for such mounting are reduced.

According to an embodiment of the present invention, the one or more WiFi units 526 are integrated in the one or more RUs 522 of the DAS itself. Thus, the WiFi units 526 are here physically located in the same casing as the RUs 522, which significantly can reduce the installation costs and the costs for rental of mounting space. Also, the WiFi units 526 are relatively low cost units, wherefore the additional cost for adding the WiFi units 526 to the DAS RUs 522 is relatively low. Hereby, WLANs can easily be achieved in the system at a very low cost.

According to different embodiments of the invention, one or more of the at least one RRH unit 521, at least one WLAN/WiFi unit 526, at least one pico base station, at least one femto base station, and at least one remote Ethernet unit 523 are integrated in the at least one DAS RUs 522. Essentially any combination of these on or more units can be integrated in the DAS RUs 522. Hereafter, a number of examples of such integrations are mention. However, a skilled person understands that also other combinations of these units are possible to integrate in the DAS RUs 522.

According to an embodiment, the at least at least one RU 522 includes at least one RRH unit 521 being integrated in the at least one RU 522. Here, the at least one digital link is arranged for supplying digital communication signals for the at least one RRH unit 521.

According to an embodiment, the at least at least one RU 522 includes at least one RRH unit 521 and at least one WLAN/WiFi unit 526 being integrated in the at least one RU 522. Here, the at least one digital link is arranged for supplying digital communication signals for the at least one RRH unit 521 and the at least one WLAN/WiFi unit 526.

According to an embodiment, the at least at least one RU 522 includes at least one WLAN/WiFi unit 526 being integrated in the at least one RU 522. Here, the at least one digital link is arranged for supplying digital communication signals for the at least one WLAN/WiFi unit 526.

According to an embodiment, the at least at least one RU 522 includes at least one at least one RRH unit 521 and at least one pico/femto base station being integrated in the at least one RU 522. Here, the at least one digital link is arranged for supplying digital communication signals for the at least one RRH unit 521 and at least one pico/femto base station.

According to an embodiment, the at least at least one RU 522 includes at least one at least one RRH unit 521 and at least one remote Ethernet unit 523 being integrated in the at least one RU 522. Here, the at least one digital link is arranged for supplying digital communication signals for the at least one RRH unit 521 and at least one remote Ethernet unit 523.

According to an embodiment, the at least at least one RU 522 includes at least one RRH unit 521, at least one WLAN/WiFi unit 526 and at least one pico/femto base station being integrated in the at least one RU 522. Here, the at least one digital link is arranged for supplying digital communication signals for the at least one RRH unit 521, the at least one WLAN/WiFi unit 526, and at least one pico/femto base station.

To be able to integrate all, or a suitable selection, of these units and services in the at least one RU 522, or interconnection unit, has a number of advantages. Only one distribution network 530, 531, 532, and only one power supply has to be used for a large number of services, which is very cost effective. Only one housing including the integrated RU 522, or interconnection unit, has to be mounted at a wall, pole, mast, or the like, which lowers the mounting space rental costs. Also, all the integrated services can be monitored by usage of the DAS monitoring system.

According to an embodiment of the present invention the distribution network 530, 531, 532 is a fiber based communication network. Thus, the RF signals being provided over the fiber based distribution network 530, 531, 532 form RF over fiber signals for the DAS.

According to other embodiments of the present invention, the distribution network 530, 531, 532 is a free-space optics communication network, a microwave communication network, a millimeter-wave communication network, or a broadband over power line communication network. A skilled person realizes that essentially any network suitable for conveying bidirectional communication at a high enough bitrate could be used as distribution network 530, 531, 532. Also, essentially any protocol and/or transmission technology may be implemented for the distribution network 530, 531, 532. It will further be appreciated that the bidirectional link 430 may be included in the communication system, or form a separate part that may be provided or previously installed by another entity.

According to an embodiment of the present invention, the standardized protocol used for transporting the digital communication to and from the at least one RRH 521 over the digital link is a Common Public Radio Interface (CPRI) protocol or an Open Base Station Architecture Initiative (OBSAI) protocol. Both of these protocols can efficiently digitize RF signals and provide open standards for a digital interface between the RRH controller 513 and the RRHs 521. Thus, a low cost and easy connection of RRHs 521 directly to the RRH controllers 513 is achieved by use of these protocols. Also, these protocols allow the service providers to initially deploy lower bitrates and then to upgrade their networks as the bandwidth requirements grow.

According to an embodiment of the present, a method for providing signals in a DAS, including a distribution network 530, 531, 532, between at least one RUC 412 and at least one active RU 422 of the DAS 400 is presented. According to the embodiment, allocation of a first part of a spectrum for the signals is performed for transmission of at least one RF link to and from the at least one active RU 522. Allocation of at least one second part of the spectrum is performed. The at least one second part is separate from said first part, and is used for transmission of at least one digital link for supplying digital communication signals for one or more of: at least one RRH unit 521, at least one WLAN unit 526, at least one pico base station, at least one femto base station, and at least one remote Ethernet unit 523.

Hereby, efficient and cost effective transmission of both analog RF signals for the DAS RUs 522 and digital signals for one or more of: at least one RRH unit 521, at least one WLAN unit 526, at least one pico base station, at least one femto base station, and at least one remote Ethernet unit 523 are provided by the DAS 500.

The methods as referred to above can be implemented by a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The distribution network and the method for the distribution network according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

ITEMIZED LIST OF EMBODIMENTS

1. A Distributed Antenna System (DAS; 400) including a distribution network (430, 431, 432) arranged for providing signaling between a Remote Unit Controller (RUC; 412) and at least one active Remote Unit (RU; 422) of said DAS, said RUC (412) being connected to a core network and providing RF signals to said DAS, wherein a first part of a spectrum of said signaling is allocated for transmission of at least one RF link to and from said at least one active RU (422); characterized in that: at least one second part of said spectrum, being separate from said first part, is allocated for transmission of at least one digital link for supplying digital communication signals for one or more of: at least one Remote Radio Head (RRH) unit (421), at least one Wireless Local Area Network (WLAN) unit (426), at least one pico base station, at least one femto base station, and at least one remote Ethernet unit (423).

2. The DAS as described in point 1, wherein said at least one digital link is arranged for supplying Ethernet communication signals.

3. The DAS as described in anyone of points 1-2, wherein said at least one digital link is arranged for supplying wireless fidelity (WiFi) communication signals, said WiFi communication signals being diplexed together with said RF signals.

4. The DAS as described in anyone of points 1-3, wherein at least one or more in the group of: a RRH unit, a WLAN unit (426); a pico base station; a femto base station; a remote Ethernet unit (423); or a combination thereof, is/are integrated in a RU of the DAS.

5. The DAS as described in anyone of points 1-4, wherein said distribution network includes a bidirectional link (430) being one network in the group of:
a fiber based communication network;
a free-space optics communication network;
a microwave communication network;
a millimeter-wave communication network;
a broadband over power line communication network;
a coaxial communication network.

6. The DAS as described in anyone of points 1-5, wherein said at least one digital link is arranged for supplying said digital communication signals for said at least one RRH (421), said digital link being arranged for utilizing one protocol in the group of: a Common Public Radio Interface (CPRI) protocol and/or an Open Base Station Architecture Initiative (OBSAI) protocol.

7. The DAS as described in anyone of points 1-6, wherein wavelength division multiplexing (WDM) is applied on said spectrum, such that each separate part of said spectrum employs a set of wavelengths being separate from wavelengths being employed by other separate parts of said spectrum.

8. The DAS as described in anyone of points 1-7, wherein frequency division multiplexing (FDM) is applied on said spectrum, such that each separate part of said spectrum employs a set of frequencies being separate from frequencies being employed by other separate parts of said spectrum.

9. The DAS as described in anyone of points 1-8, wherein said at least one digital link is arranged for supplying said digital communication signals for at least one RRH unit (421) and/or at least one Wireless Local Area Network (WLAN) unit (426) and/or at least one pico base station and/or at least one femto base station and/or at least one remote Ethernet unit (423).

10. The DAS as described in anyone of points 1-9, wherein said at least one RU includes the units of one in the group of: at least one RRH unit (421); at least one WLAN unit (426); at least one pico base station; at least one femto base station; at least one remote Ethernet unit (423); or a combination thereof.

11. A method for providing signaling in a Distributed Antenna System (DAS; 400), including a distribution network (430, 431, 432), between at least one Remote Unit Controller (RUC; 412) and at least one active Remote Unit (RU; 422) of said DAS (400), said RUC (412) being connected to a core network and providing RF signals to said DAS (400); said method including:—allocation of a first part of a spectrum of said signaling for transmission of at least one RF link to and from said at least one active RU (422); characterized by: allocation of at least one second part of said spectrum, being separate from said first part, for transmission of at least one digital link for supplying digital communication signals for one or more of: at least one Remote Radio Head (RRH) unit (421), at least one Wireless Local Area Network (WLAN) unit (426), at least one pico base station, at least one femto base station, and at least one remote Ethernet unit (423).

12. The method as described in point 11, wherein said at least one digital link is allocated for supplying Ethernet communication signals.

13. The method as described in anyone of points 11-12, wherein said at least one digital link is allocated for supplying wireless fidelity (WiFi) communication signals, said WiFi communication signals being diplexed together with said RF signals.

14. Computer program, characterized in code means, which when run in a computer causes the computer to execute the method as described in any one of points 11-13.

15. Computer program product including a computer readable medium and a computer program as described in point 15, wherein said computer program is included in the computer readable medium.

The invention claimed is:

1. A first interconnection unit comprising a first and a second communication interface, a first and a second electro-optical converter, and a multiplexing unit, the first interconnection unit being adapted to:
receive, at the first communication interface, a first stream of electrically transmitted analog information (A1E);
convert, at the first electro-optical converter, said first stream of electrically transmitted analog information (A1E) into a first stream of optically transmitted analog information (A1o);
receive, at the second communication interface, a first stream of electrically transmitted digital information (D1E);
convert, at the second electro-optical converter, said first stream of electrically transmitted digital (D1E) information into a first stream of optically transmitted digital information (D1o);
multiplex, at the multiplexing unit, said first stream of optically transmitted analog information (A1o) and said first stream of optically transmitted digital information (D1o);
output said multiplexed information (A1o, D1o) over a bidirectional link to a second multiplexing unit in a first direction;
receive, at the multiplexing unit, multiplexed second stream of optically transmitted analog information (A2o) and second stream of optically transmitted digital information (D2o) transmitted over the bidirectional link by said second multiplexing unit in a second direction;
de-multiplex, at the multiplexing unit, said multiplexed second stream of optically transmitted analog information (A2o) and second stream of optically transmitted digital information (D2o);
convert, at the first electro-optical converter, said second stream of optically transmitted analog information (A2o) into a second stream of electrically transmitted analog information (A2E);
output, at the first communication interface, said second stream of electrically transmitted analog information (A2E);
convert, at the second electro-optical converter, said second stream of optically transmitted digital information (D2o) into a second stream of electrically transmitted digital information (D2E); and
output, at the second communication interface, said second stream of electrically transmitted digital information (D2E).

2. The first interconnection unit according to claim 1, wherein said first multiplexing unit and/or said second multiplexing unit is a wavelength division multiplexing (WDM) unit.

3. The first interconnection unit according to claim 1, wherein the second stream of electrically transmitted digital information (D2E) is adapted for supplying communication signals for one or more of: at least one Remote Radio Head unit, at least one Wireless Local Area Network unit, at least one pico base station, at least one femto base station, and/or at least one remote Ethernet unit.

4. The first interconnection unit according to claim 1, further adapted to utilize a Common Public Radio Interface (CPRI) communication protocol and/or an Open Base Station Architecture Initiative (OBSAI) communication protocol.

5. The first interconnection unit according to claim 1, wherein the first stream of optically transmitted digital information (D1o) and/or second stream of optically transmitted digital information (D2o) is adapted for supplying communication signals for at least one of at least one Remote Radio Head unit and/or at least one Ethernet unit.

6. The first interconnection unit according to claim 1, wherein said first multiplexing unit and/or said second multiplexing unit is a wavelength division multiplexing (WDM) unit.

7. The first interconnection unit according to claim 1, wherein the first stream of electrically transmitted digital information ($D1_E$) is adapted for supplying communication signals for one or more of: at least one Remote Radio Head unit, at least one Wireless Local Area Network unit, at least one pico base station, at least one femto base station, and/or at least one remote Ethernet unit.

8. The first interconnection unit according to claim 1, further adapted to utilize a Common Public Radio Interface (CPRI) communication protocol and/or an Open Base Station Architecture Initiative (OBSAI) communication protocol.

9. The first interconnection unit according to claim 1, wherein the first stream of optically transmitted digital information ($D1_O$) and/or second stream of optically transmitted digital information ($D2_O$) is adapted for supplying communication signals for at least one of at least one Remote Radio Head unit and/or at least one Ethernet unit.

10. A second interconnection unit comprising a first and a second communication interface, a first and a second electro-optical converter, and a multiplexing unit, the second interconnection unit being adapted to:
receive, at the multiplexing unit, multiplexed first stream of optically transmitted analog information (A1o) and first stream of optically transmitted digital information (D1o) transmitted over a bidirectional link in a second direction;
de-multiplex, at the multiplexing unit, said multiplexed first stream of optically transmitted analog information (A1o) and first stream of optically transmitted digital information (D1o);
convert, at the first electro-optical converter, said first stream of optically transmitted analog information (A1o) into a first stream of electrically transmitted analog information (A1E);
output, at the first communication interface, said first stream of electrically transmitted analog information (A1E);

convert, at the second electro-optical converter, said first stream of optically transmitted digital information (D1o) into a first stream of electrically transmitted digital information (D1E);

output, at the second communication interface, said first stream of electrically transmitted digital information (D1E);

output at the second multiplexing unit a second stream of multiplexed information (A2o, D2o) over said bidirectional link to a first multiplexing unit in a first direction;

convert, at the first electro-optical converter, said second stream of electrically transmitted analog information (A2E) into a second stream of optically transmitted analog information (A2o);

convert, at the second electro-optical converter, said second stream of electrically transmitted digital information (D2E) into a second stream of optically transmitted digital information (D2o);

multiplex, at the multiplexing unit, said second stream of optically transmitted analog information (A2o) and second stream of optically transmitted digital information (D2o); and output said multiplexed second stream of optically transmitted analog information (A2o) and second stream of optically transmitted digital information (D2o) over said bidirectional link.

11. The second interconnection unit according to claim 10, wherein said first multiplexing unit and/or said second multiplexing unit is a wavelength division multiplexing, WDM, unit.

12. The second interconnection unit according to claim 10, further adapted to utilize a Common Public Radio Interface (CPRI) communication protocol and/or an Open Base Station Architecture Initiative (OBSAI) communication protocol.

13. The first interconnection unit according to claim 10, wherein the first stream of optically transmitted digital information (D1o) and/or second stream of optically transmitted digital information (D2o) is adapted for supplying communication signals for at least one of at least one Remote Radio Head unit and/or at least one Ethernet unit.

14. The second interconnection unit according to claim 10, wherein the second stream of electrically transmitted digital information (D2E) is adapted for supplying communication signals for one or more of: at least one Remote Radio Head unit, at least one Wireless Local Area Network unit, at least one pico base station, at least one femto base station, and/or at least one remote Ethernet unit.

15. The second interconnection unit according to claim 10, wherein said first multiplexing unit and/or said second multiplexing unit is a wavelength division multiplexing, WDM, unit.

16. The second interconnection unit according to claim 10, further adapted to utilize a Common Public Radio Interface (CPRI) communication protocol and/or an Open Base Station Architecture Initiative (OBSAI) communication protocol.

17. The first interconnection unit according to claim 10, wherein the first stream of optically transmitted digital information ($D1_O$) and/or second stream of optically transmitted digital information ($D2_O$) is adapted for supplying communication signals for at least one of at least one Remote Radio Head unit and/or at least one Ethernet unit.

18. The second interconnection unit according to claim 10, wherein the first stream of electrically transmitted digital information ($D1_E$) is adapted for supplying communication signals for one or more of: at least one Remote Radio Head unit, at least one Wireless Local Area Network unit, at least one pico base station, at least one femto base station, and/or at least one remote Ethernet unit.

* * * * *